Figure 1:
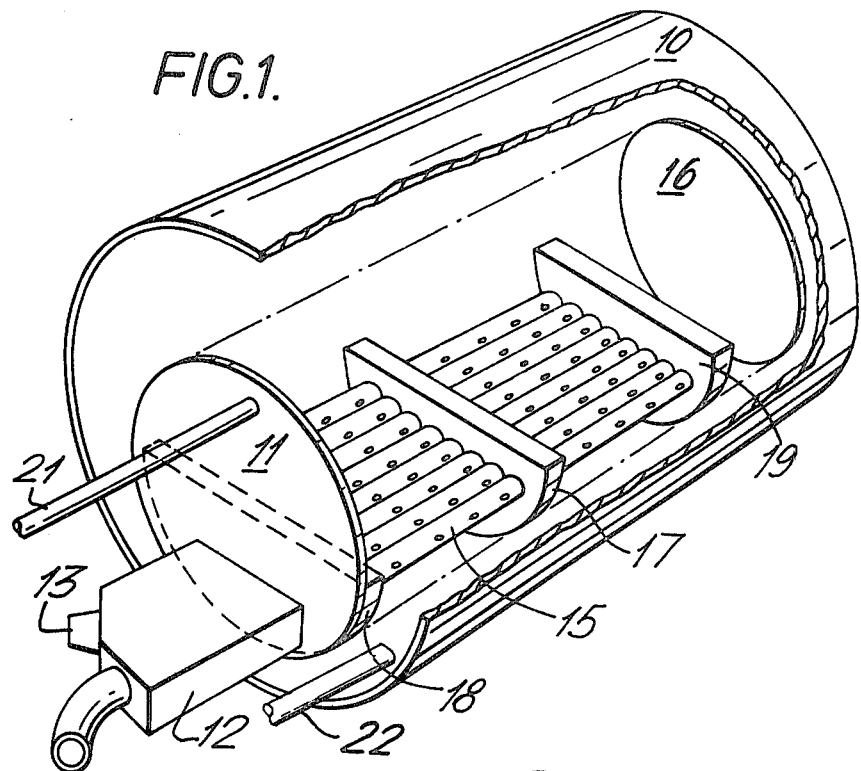

United States Patent [19]

Caplin

[11] 4,197,085

[45] Apr. 8, 1980

[54] GAS INJECTORS FOR FLUIDIZED BEDS

[75] Inventor: Peter B. Caplin, Sunbury-on-Thames, England

[73] Assignee: The Energy Equipment Company Limited, Bedfordshire, England

[21] Appl. No.: 850,304

[22] Filed: Nov. 10, 1977

[51] Int. Cl.² .................. F27B 19/00; F22B 5/00
[52] U.S. Cl. ........................... 432/90; 122/233; 432/58
[58] Field of Search .............. 34/57 A, 57 R; 432/58, 432/90; 122/233

[56] References Cited

U.S. PATENT DOCUMENTS

| | | | |
|---|---|---|---|
| 2,178,059 | 10/1939 | Zier | 432/90 |
| 2,729,428 | 1/1956 | Milmore | 34/57 A |
| 2,848,383 | 8/1958 | Bailey | 432/58 |
| 3,040,439 | 6/1962 | Frost | 34/57 A |
| 3,387,590 | 6/1968 | Bishop | 34/57 A |
| 3,598,375 | 8/1971 | Nauta | 432/58 |
| 3,752,224 | 8/1973 | Sproul | 34/57 R |
| 3,892,046 | 7/1975 | Cooke | 34/57 A |
| 3,925,024 | 12/1975 | Hollingsworth et al. | 34/57 A |

Primary Examiner—John J. Camby

[57] ABSTRACT

In an injector for supplying gas into a fluidized bed, a distributor having a plurality of spaced elements located within a particulate material forming a fluidized bed to extend generally transversely therein.

5 Claims, 2 Drawing Figures

GAS INJECTORS FOR FLUIDIZED BEDS

This invention relates to gas injectors for fluidised beds. More particularly but not exclusively the invention is concerned with methods of and devices for injecting gas into combustion apparatus having fluidised beds.

The use in a combustion apparatus such as a boiler or incinerator of a fluidised bed of finely divided inert particles, for example of sand, is known. In such apparatus the fluidised bed acts to accept and support fuel or other combustible material delivered to the apparatus, and in addition provides zones for the distribution and combustion of the fuel or combustible material.

It is usual when using a fluidised bed in a combustion apparatus to inject gas into the material forming the bed via an array of apertures in the bed support, the injected gas then rises through the material of the bed causing it to act substantially as a fluid medium.

Air is usually used as the injected gas, as air, as well as acting to "fluidise" the particulate material forming the bed provides oxygen necessary to enable combustion of the fuel or other combustible material.

Heat released by combustion of the fuel in a boiler having a fluidised bed is absorbed by the particulate material of the bed and then given up by radiation, conduction and convection, to heat receiving surfaces as the particles of the bed are agitated by the fluidisation effect and come into contact with those heat receiving surfaces.

The provision of a fluidised bed in an existing boiler or incinerator has proved difficult in practice as it is necessary to provide appropriate means for injecting gas into the material of the bed.

An object of the invention is the provision of a novel form of gas injection for a fluidised bed which enables ready formation of a fluidised bed in an existing boiler or incinerator.

One aspect of the invention provides a gas injector for a fluidised bed, the injector comprising means for supplying gas to a distributer having a plurality of spaced elements, which elements are for location within a particulate material forming a fluidised bed to extend generally transversely therein.

Each element preferably comprises a hollow tube formed with a plurality of apertures through which gas may pass to the material forming the fluidised bed.

The gas supply means may comprise a plenum chamber to which each of said elements is coupled.

A gas injector in accordance with the invention may be used with advantage in a fluidised bed combustion apparatus in which case the gas supply means is preferably adapted to be fitted to a vertical wall of the apparatus such that the said elements extend generally normally of that wall.

A second aspect of the invention provides a fluidised bed combustion apparatus including a gas injector comprising means for supplying gas to a distributor having a plurality of spaced elements located within the particulate material forming the fluidised bed and extending generally transversely therein.

In accordance with this second aspect of the invention it is preferably provided that gases resulting from combustion in the apparatus are collected and introduced into the gas supplied to the injector.

Preferably the means for supplying gas to the distributor comprises a positive displacement air pump or blower.

A further aspect of the invention provides a method for injecting gas into a fluidised bed in a combustion apparatus, the method comprising positioning a distributor having a plurality of spaced elements such that each element is located within the material forming the fluidised bed to extend generally transversely therein, and of supplying gas to the distributor such that the gas passes through said elements to the material forming the fluidised bed.

Further aspects, features and advantages of the invention will become apparent from the following description which is made with reference to the accompanying drawings in which there is shown at:-

Figure 2:
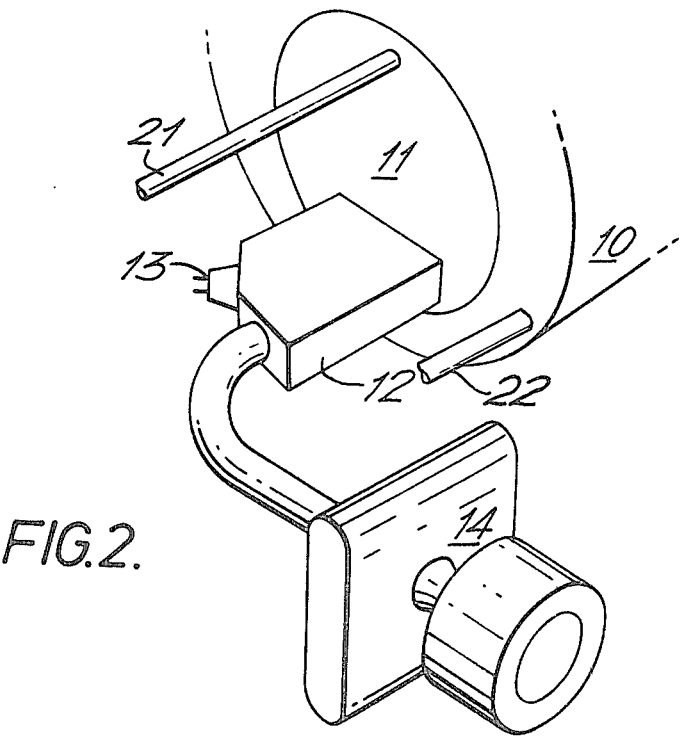

FIG. 1 a single furnace shell boiler incorporating a gas injector in accordance with the present invention; and at FIG. 2 a means for supplying gas to the injector shown in FIG. 1

As can be seen in the figure, the boiler comprises a combustion chamber 10, a front vertical wall of which supports a front plate 11 carrying a plenum chamber 12. Chamber 12 is lined with a refractory material and incorporates a pilot burner or heater 13. Chamber 12, as will be described below, may be used to raise the temperature of the fluidised bed materials prior to ignition of the boiler fuel.

The plenum chamber 12 is supplied with air from a centrifugal fan or blower 14 (preferably from a positive displacement blower of the Rootes type), which also supplies air, when required, to the pilot burner 13.

Chamber 12 feeds air from the blower 14 to an array of primary sparge elements 15 which, as can be seen in the drawings, are located in the material forming the fluidised bed, and extend generally horizontally therein toward the furnace back plate 16.

As can be seen the sparge elements 15 are submerged within a finely divided inert particulate material constituting a fluidised bed.

Support for the sparge element 15 within the boiler is provided by an intermediate refractory baffle 17 and by refractory baffles 18 and 19 at the ends of the elements 15 adjacent the front plate 11 and the back plate 16 of the boiler respectively.

The baffles 17, 18 and 19 may act, as shown, to provide front and rear bays in the fluidised bed, but if the bed is of relatively short length the intermediate baffle may be omitted.

The sparge elements 15 are provided with a multiplicity of apertures as shown.

The front plate 11 may also support one or more further plenum chambers (not shown) each supplied with air from one or more further positive displacement blowers (not shown) and which act as gas supplies to a further array of sparge elements extending through the fluidised bed.

The finely divided inert particulate material, for example sand, which constitutes the fluidised bed is contained within the limits of the furnace solely by the sides of the chamber 10, the furnace front plate 11, and the rear refractory baffle 19, and not by the sparge elements 15.

In addition to providing intermediate and terminal support the refractory baffles may enable the formation in the boiler of differential levels between the front and back bays of the fluidised bed. It may be desirable for the front and rear bays of the fluidised bed combustion apparatus to be of different depths for two reasons. Firstly each refractory baffle acts as a dam and the relatively light ash materials may overflow the dam since the level of the next bay of the fluidised bed is slightly lower. This overflowing occurs at each of two baffles and these baffles therefore provide a means of ash transfer. Secondly it may be desirable to have a differential in the levels of the bed in the different bays, such that the surface level of the bed becomes lower in steps along the bed. This ensures that a progressively greater volume is provided above each bay so that gas pressure builds up as the gaseous combustion products pass from the bed is counteracted.

Fuel is fed to the boiler via a fuel line 21.

The fuel fed to the boiler may be either liquid or solid form and it may be fed by means of a screw feed, ram feed or pneumatic feed to the boiler to enter the bed directly or to pass into the volume above the bed. As soon as the fuel reaches the boiler it enters into or falls onto the fluidised bed where it is accepted and supported unitl it burns.

The means for supplying gas to the injector may be arranged to provide, across a venturi device (not shown) located between the blower 14 and the plenum chamber 12, a differential gas pressure. Such a venturi device could serve to both maintain a high upstream air pressure for the pilot burner 13 via a connecting pipe (not shown) and to collect foul gas exhausted from the boiler along the fuel feed line to which the downstream side of the venturi device is connected via a further connecting pipe (also now shown).

The heater 13 may be operated to raise and if necessary maintain the temperature of the gases passed to the fluidised bed which in turn give up their heat to the particulate material of the fluidised bed such that the bed temperature increases. As soon as a sufficiently high temperature has been reached in the boiler fuel is passed to the bed, such that the fuel is ignited as soon as it reaches the boiler. The heater 13 may then be wholly or partially turned off.

Water or another heat transfer medium may be heated by the boiler either by passing the water through the sides of the boiler or through pipes dipping into the fluidised bed in the boiler as illustrated at numeral 22 in the Figures.

What I claim is:

1. A fluidished bed boiler comprising an elongated generally cylindrical housing enclosed by end walls to form a combustion chamber, said housing being positioned with its longitudinal axis extending generally horizontally, a bed of inert particulate material located within said chamber, means for supplying fuel to said bed, steam-raising means for passing water in heat-exchange relation with the material of said bed, and means for supplying air to said fluidized bed to fluidize said bed and support combustion of fuel passed thereto, said air supplying means comprising a plurality of tubes extending along the length of said housing each of which tube is provided with a plurality of plain apertures opening substantially horizontally thereof, a plenum chamber formed as a part of one end wall of the housing and extending outwardly therefrom, the inner side of said plenum chamber being connected to the ends of said tubes to distribute air to said tubes and a pump connected to an exterior side of said plenum chamber for supplying air under pressure to said plenum chamber and a heater operatively connected to said plenum chamber through an exterior side thereof for preheating the air therein prior to being distributed to said tubes.

2. Apparatus according to claim 1, in which said steam-raising means comprises a water shell around said housing.

3. Apparatus according to claim 1, in which said steam-raising means comprises water tubes dipping into said bed.

4. Apparatus according to claim 1, including end baffle members at the extremities of said tubes extending transversely thereof and supporting said tubes.

5. Apparatus according to claim 4, including a transversely extending and tube supporting intermediate baffle member positioned between said end baffle members, said end and intermediate baffle members serving further to provide front and rear bays in the fluidized bed.

* * * * *